United States Patent
Bin Sabtu et al.

(10) Patent No.: US 10,834,910 B2
(45) Date of Patent: Nov. 17, 2020

(54) DUAL-BEARING REEL

(71) Applicants: Shimano Inc., Osaka (JP); Shimano Components (Malaysia) SDN. BHD., Johor (MY)

(72) Inventors: Baihaki Bin Sabtu, Johor (MY); Abu Supian Bin Ahmad, Johor (MY); Mohd Syamsul Johary Bin Ismail, Johor (MY); Keigo Kitajima, Osaka (JP); Motohiro Niitsuma, Osaka (JP); Ami Higuchi, Osaka (JP)

(73) Assignees: Shimano Inc., Osaka (JP); SHUMANO COMPONENTS (MALAYSIA) SDN. BHD., Johor (MY)

( * ) Notice: Subject to any disclaimer, the term of this patent is extended or adjusted under 35 U.S.C. 154(b) by 113 days.

(21) Appl. No.: 16/027,690

(22) Filed: Jul. 5, 2018

(65) Prior Publication Data

US 2019/0133101 A1 May 9, 2019

(30) Foreign Application Priority Data

Nov. 7, 2017 (JP) .................................. 2017-214572

(51) Int. Cl.
*A01K 89/01* (2006.01)
*A01K 89/015* (2006.01)

(52) U.S. Cl.
CPC ...... *A01K 89/0176* (2015.05); *A01K 89/0192* (2015.05); *A01K 89/01928* (2015.05)

(58) Field of Classification Search
CPC ............ A01K 89/0186; A01K 89/0188; A01K 89/0189; A01K 89/01928
See application file for complete search history.

(56) References Cited

U.S. PATENT DOCUMENTS

| 4,648,566 A * | 3/1987 | Furomoto | .......... A01K 89/0189 242/258 |
| 4,798,355 A * | 1/1989 | Kaneko | .............. A01K 89/0189 242/261 |
| 5,690,288 A * | 11/1997 | Yamaguchi | ........ A01K 89/0186 242/268 |
| 2003/0111569 A1* | 6/2003 | Hitomi | ........... A01K 89/011223 242/321 |

(Continued)

FOREIGN PATENT DOCUMENTS

| JP | 4-133178 U | 12/1992 | |
| JP | 07231739 A * | 9/1995 | ......... A01K 89/0189 |

*Primary Examiner* — Emmanuel M Marcelo
(74) *Attorney, Agent, or Firm* — Global IP Counselors, LLP

(57) ABSTRACT

A dual-bearing reel is provided that basically includes a reel main body, a spool, a clutch operating member and a first barrier portion. The reel main body has a first side plate and a second side plate. The second side plate is disposed at a distance from the first side plate in an axial direction. The clutch operating member is movably supported on the reel main body in a vertical direction between the first side plate and the second side plate behind the spool. The clutch operating member switches between a transmitting and disconnecting of a rotational force to the spool. The first barrier portion is provided on one of the clutch operating member and the reel main body. The first barrier portion prevents the fishing line from entering between the clutch operating member and the first side plate of the reel main body.

18 Claims, 5 Drawing Sheets

(56) References Cited

U.S. PATENT DOCUMENTS

| | | | | |
|---|---|---|---|---|
| 2013/0153700 A1* | 6/2013 | Niitsuma | ........... | A01K 89/0186 |
| | | | | 242/310 |
| 2015/0296762 A1* | 10/2015 | Haraguchi | ........... | A01K 89/015 |
| | | | | 242/261 |
| 2015/0327527 A1* | 11/2015 | Ikebukuro | .......... | A01K 89/0192 |
| | | | | 242/264 |
| 2015/0342167 A1* | 12/2015 | Takechi | ............. | A01K 89/0189 |
| | | | | 242/257 |
| 2015/0366179 A1* | 12/2015 | Ikuta | ................... | A01K 89/006 |
| | | | | 242/261 |

\* cited by examiner

DUAL-BEARING REEL

CROSS-REFERENCE TO RELATED APPLICATIONS

This application claims priority under 35 U.S.C. § 119 to Japanese Patent Application No. 2017-214572, filed Nov. 7, 2017. The entire disclosure of Japanese Patent Application No. 2017-214572 is hereby incorporated herein by reference.

BACKGROUND

Field of the Invention

This invention generally relates to a fishing reel. More specifically, the present invention relates to a dual-bearing reel capable of unreeling a fishing line.

Background Information

In a dual-bearing reel, a clutch operating member is provided behind the spool for switching between transmitting and disconnecting the rotational force from the handle to the spool (See Japanese Utility Model Application Publication No. Hei 4-133178 referred to herein after as Patent Document 1). In addition, the clutch operating member is movably supported on the reel main body to move in the vertical direction.

SUMMARY

With a clutch operating member, the movement in the vertical direction becomes smoother as the axial length becomes shorter. However, if the axial length of the clutch operating member becomes shorter than the axial length of the spool, as in the case of the clutch operating member of Patent Document 1, then the fishing line tends to readily enter between the clutch operating member and the reel main body, which could cause the line to become entangled.

One object of the present invention is to prevent the line from becoming entangled between the clutch operating member and the reel main body, even when the axial length of the clutch operating member is made shorter than the axial length of the spool.

A dual-bearing reel according to one aspect of the present invention is configured to unreel a fishing line. The dual-bearing reel basically comprises a reel main body, a spool, a clutch operating member and a barrier portion. The reel main body comprises a first side plate, and a second side plate that is spaced apart from the first side plate in an axial direction. The spool comprises a bobbin trunk, a first flange portion disposed on a side of the bobbin trunk adjacent to the first side plate, and a second flange portion disposed on a side of the bobbin trunk adjacent to the second side plate. The the first and second flange portions have larger outer diameters than an outer periphery of the bobbin trunk. The spool is rotatably supported on the reel main body between the first side plate and the second side plate for winding the fishing line around the outer periphery of bobbin trunk. The clutch operating member includes an operating part that has an axial length that is shorter than the axial length of the spool. The clutch operating member is movably supported on the reel main body behind the spool to move in a vertical direction with respect to the reel main body between the first side plate and the second side plate. The clutch operating member is configured to switch between transmitting and disconnecting a rotational force inputted to the spool. The barrier portion is provided on one of the clutch operating member and the reel main body. The barrier portion is arranged to prevent the fishing line from entering between the clutch operating member and the first side plate of the reel main body.

In this dual-bearing reel, if a fishing line attempts to enter between the clutch operating member and the reel main body, the fishing line comes into contact with the barrier portion. That is, the barrier portion serves as a wall and restricts the entry of the fishing line. Accordingly, it is possible to prevent fishing line from entering between the clutch operating member and the reel main body. It is thereby possible to prevent the line from becoming entangled between the clutch operating member and the reel main body. In addition, because the axial length of the operating part of the clutch operating member is shorter than the axial length of the spool, the movement of the clutch operating member in the vertical direction becomes smooth.

Preferably, the barrier portion projects from one of the clutch operating member and the first side plate side of the reel main body toward the other of the clutch operating member and the reel main body on the first side plate side. In this case, it is possible to prevent the fishing line from entering between the clutch operating member and the reel main body with a simple configuration, which increases the freedom of design of the dual-bearing reel.

Preferably, the barrier portion projects from the clutch operating member toward the first side plate of the reel main body, and the barrier portion moves integrally with the clutch operating member. In this case, because the barrier portion moves integrally with the clutch operating member, it is possible to prevent fishing line from entering between the clutch operating member and the reel main body by, for example, simply providing a barrier portion at the upper end of the clutch operating member.

Preferably, the barrier portion is disposed in a position where at least a part of the barrier portion overlaps with the first flange portion of the spool in a front-rear direction of reel main body. In this case, it is possible effectively to prevent fishing line from entering between the clutch operating member and the first side plate of the reel main body by means of a barrier portion.

Preferably, the barrier portion includes an inclined portion that is inclined to guide the fishing line from the first side plate side of the reel main body towards the operating part of the clutch operating member. In this case, because fishing line that comes into contact with the barrier portion is guided by the inclined portion to a position away from the space between the clutch operating member and the reel main body, it is possible to better prevent the fishing line from entering between the clutch operating member and the reel main body.

According to the present invention, it is possible to prevent a fishing line from becoming entangled between the clutch operating member and the reel main body, even when the axial length of the clutch operating member is made shorter than the axial length of the spool.

BRIEF DESCRIPTION OF THE DRAWINGS

Referring now to the attached drawings which form a part of this original disclosure.

DETAILED DESCRIPTION OF EMBODIMENTS

Figure 1:
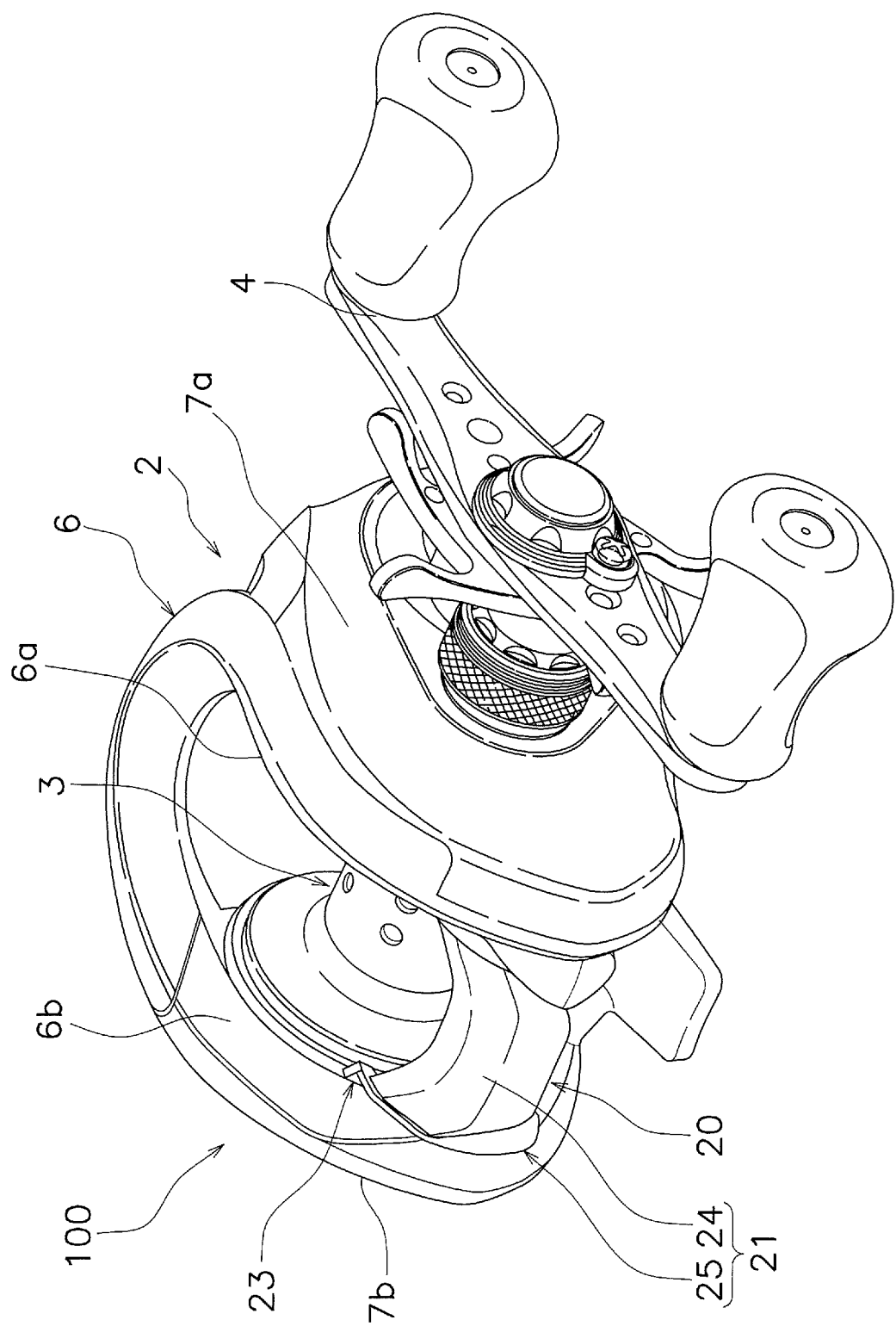
FIG. 1 is a perspective view of a dual-bearing reel in accordance with a first embodiment.

Selected embodiments will now be explained with reference to the drawings. It will be apparent to those skilled in the fishing field from this disclosure that the following descriptions of the embodiments are provided for illustration only and not for the purpose of limiting the invention as defined by the appended claims and their equivalents.

As shown in FIGS. 1 to 4, a dual-bearing reel 100 is illustrated in accordance with one embodiment. The dual-bearing reel 100 basically comprises a reel main body 2, a spool 3, a handle 4 and a clutch operating member 20. The dual-bearing reel 100 is capable of unreeling a fishing line in a forward direction. The dual-bearing reel 100 is also capable of reeling the fishing line in a rearward direction. In particular, the spool 3 is rotatable supported on the reel main body 2 to rotate about an axis of rotation A.

In the present disclosure, when fishing is performed, the direction in which the fishing line is unreeled is referred to as a front or forward direction, and the opposite direction is referred to as the rear or rearward direction. Additionally, left and right refer to left and right as seen from the rear of the dual-bearing reel 100. In addition, the direction in which the spool 3 rotates is referred to as an axial direction.

Figure 2:
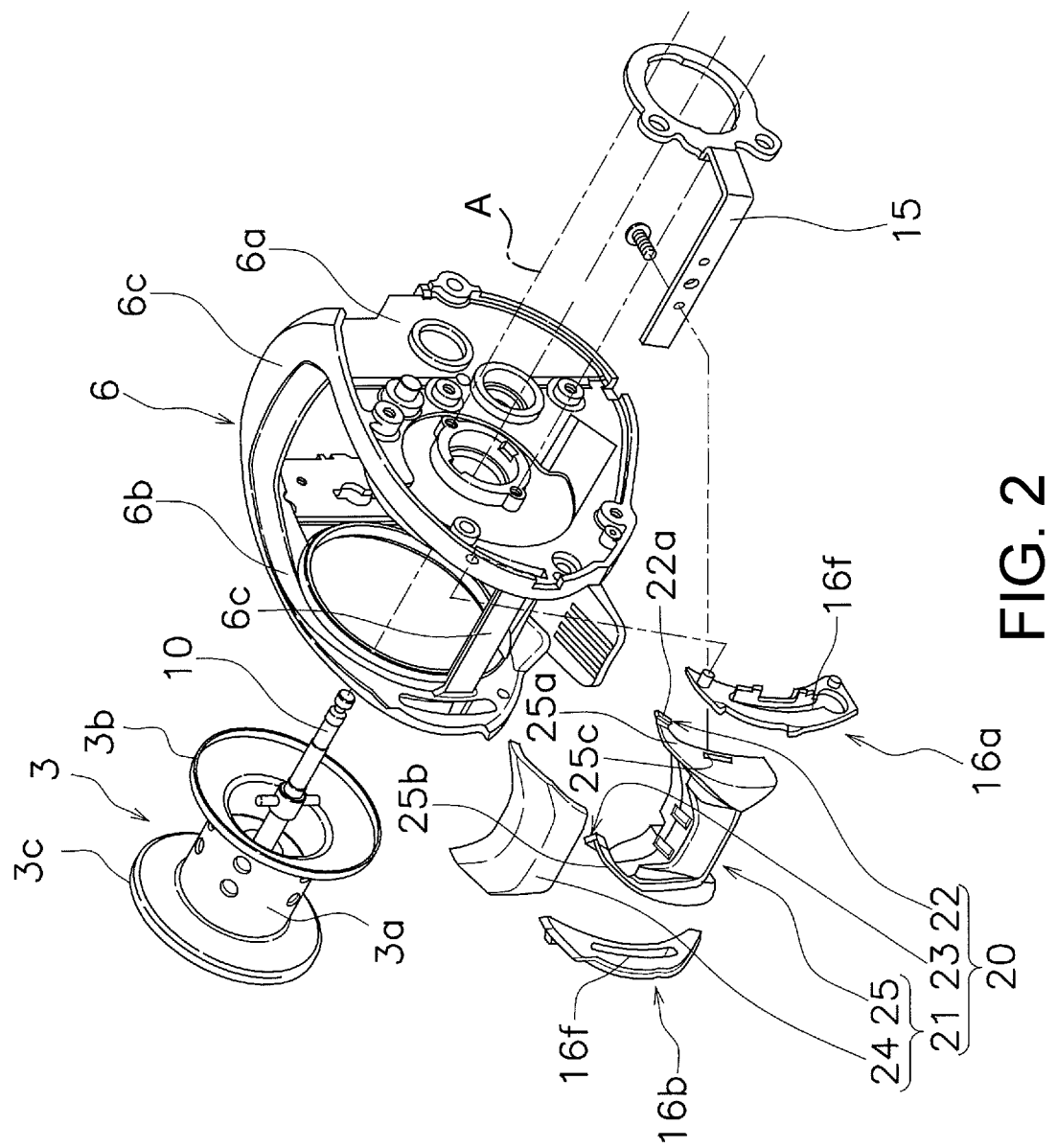
FIG. 2 is an exploded perspective view of the dual-bearing reel that shows a frame and a clutch operating member.

As shown in FIGS. 1 and 2, the reel main body 2 comprises a frame 6, a first side cover 7a and a second side cover 7b. The frame 6 has a first side plate 6a, a second side plate 6b and a plurality of connecting portions 6c.

The first side plate 6a is disposed on a right side of the frame 6. The first side plate 6a has a first guide plate 16a that is mounted on an inner circumferential surface of a rear portion of the first side plate 6a. The second side plate 6b is disposed on a left side of the frame 6 that is spaced apart from the first side plate 6a in the axial direction. The second side plate 6b has a second guide plate 16b that is mounted on the inner circumferential surface of the rear portion of the second side plate 6b. The first guide plate 16a and the second guide plate 16b each have a guide groove 16f that extends substantially in the vertical direction. The connecting portions 6c extend in the axial direction and connect the first side plate 6a and the second side plate 6b. The first side plate 6a and the second side plate 6b can be formed integrally with the frame 6.

The first side cover 7a covers the right side of the first side plate 6a of the frame 6. The second side cover 7b covers the left side of the second side plate 6b of the frame 6.

The spool 3 is rotatably supported on the reel main body 2 between the first side plate 6a and the second side plate 6b. Specifically, the spool 3 is fixed to a spool shaft 10. The spool shaft 10 extends through the center of the spool 3 in the axial direction. The spool 3 rotates integrally with the spool shaft 10. The spool shaft 10 is rotatably supported on the reel main body 2 via a pair of axle bearings, which are not shown. The axle bearings are disposed in the reel main body 2.

The spool 3 comprises a bobbin trunk 3a, a first flange portion 3b, and a second flange portion 3c. A fishing line can be wound around an outside or outer periphery of the bobbin trunk 3a. The first flange portion 3b is disposed on a side of the bobbin trunk 3a adjacent to the first side plate 6a. The first flange portion 3b has a larger diameter than an outer diameter of the bobbin trunk 3a. The second flange portion 3c is disposed on a side of the bobbin trunk 3a adjacent to the second side plate 6b. The second flange portion 3c has a larger diameter than the outer diameter of the bobbin trunk 3a.

The handle 4 is rotatably supported on the reel main body 2. The rotation of the handle 4 is transmitted to the spool 3 via a rotation transmission mechanism, not shown. Thus, the handle 4 is operatively coupled to the spool 3 to rotate the spool 3 as the handle 4 is rotated while the clutch operating member 20 is switched to transmit a rotational force to the spool 3 as explained below. Because the rotation transmission mechanism has the same configuration as a conventional rotation transmission mechanism, a description thereof has been omitted.

Figure 3:
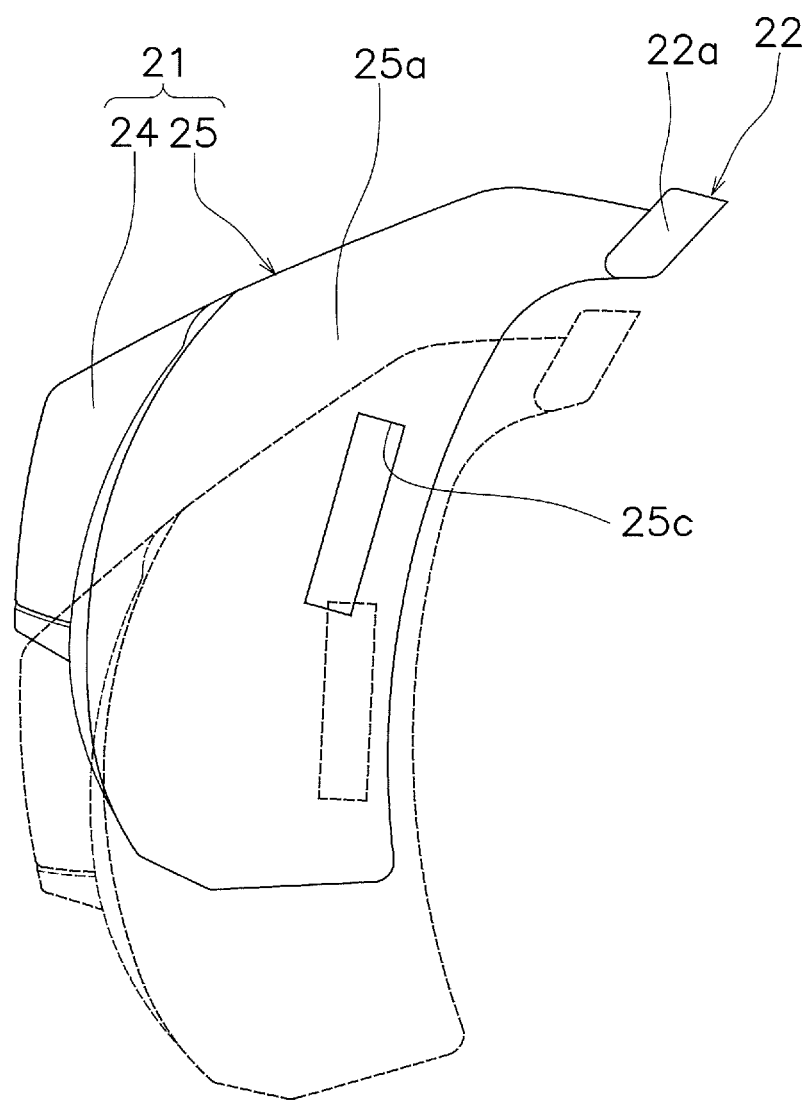
FIG. 3 is a side elevational view of the clutch operating member for the dual-bearing reel illustrated in FIGS. 1 and 2.

The clutch operating member 20 is an operating member for switching between transmitting and disconnecting a rotational force to the spool 3 in response to a rotation operation of the handle 4. The clutch operating member 20 is disposed behind the spool 3. The clutch operating member 20 is supported on the reel main body 2 so as to be movable in a vertical direction between the first side plate 6a and the second side plate 6b. FIG. 3 is a side elevational view of the clutch operating member 20. The clutch operating member 20 is capable of moving between a first position, indicated by the solid line, and a second position, indicated by the broken line. When the clutch operating member 20 is in the first position, the rotational force of the handle 4 is transmitted to the spool 3. When the clutch operating member 20 is in the second position, on the other hand, the rotational force of the handle 4 is not transmitted to the spool 3. FIGS. 1 to 4 show a state in which the clutch operating member 20 is in the first position (a rotational force transmitting position).

The clutch operating member 20 is connected to a clutch control mechanism, not shown, via a coupling member 15 that is disposed on the first side plate side. The clutch control mechanism connects the spool 3 and the handle 4, or disconnects the spool 3 and the handle 4, according to an operation of the clutch operating member 20. The clutch operating member 20 is moved from the second position to the first position by a clutch return mechanism, not shown, when the handle 4 is rotated in a fishing line winding direction while the clutch operating member 20 is in the second position. Since the clutch control mechanism and the clutch return mechanism have the same configurations as conventional ones, the descriptions thereof have been omitted.

The clutch operating member 20 has an operating part 21, a first barrier portion 22 and a second barrier portion 23. The first barrier portion 22 and the second barrier portion 23 are each examples of a barrier portion. The second barrier portion 23 can also be considered an additional barrier portion.

Figure 4:
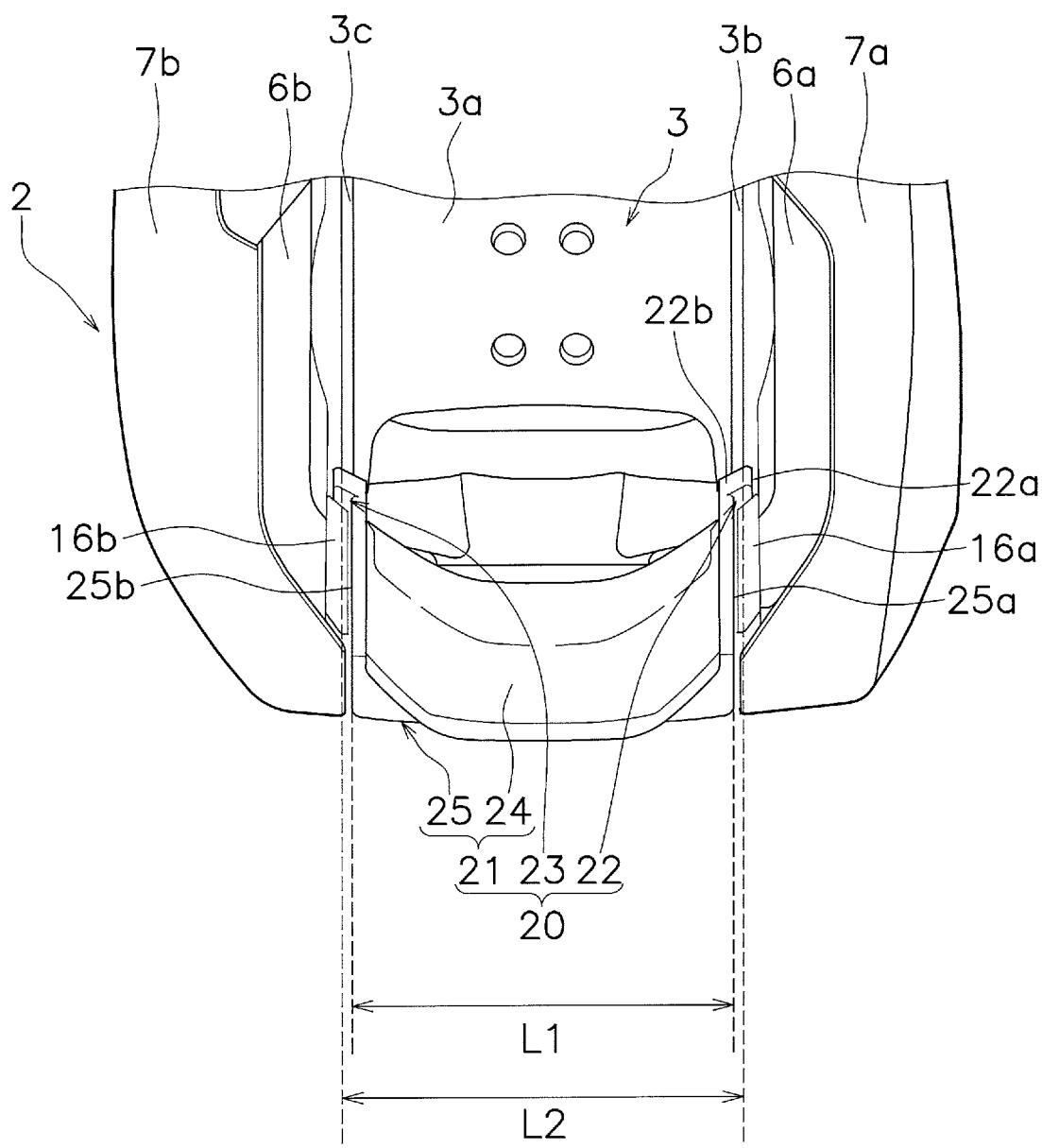
FIG. 4 is a partial top plan view of a portion of the dual-bearing reel illustrated in FIGS. 1 to 3.

The operating part 21 is used when the clutch operating member 20 is moved from the first position to the second position, or from the second position to the first position. Specifically, it is possible to move the clutch operating member 20 from the first position to the second position by a user pressing the operating part 21 down with a thumb. In addition, the operating part 21 also functions as a thumb rest on which a user can place his or her thumb. In addition, as shown in FIG. 4, the axial length L1 of the operating part 21 is shorter than the axial direction L2 of the spool 3.

The operating part 21 includes a cover member 24 and a support member 25. The cover member 24 is fixed to the support member 25 so as to be integrally movable. The cover member 24 covers an upper portion and a rear portion of the support member 25. As shown in FIG. 4, the cover member 24 is disposed between the first side surface 25a and the second side surface 25b of the support member 25 in the axial direction. In addition, as shown in FIGS. 3 and 4, the cover member 24 projects further rearward than the support member 25. The cover member 24 can be integrally formed with the support member 25.

The support member 25 supports the cover member 24 so as to be integrally movable. The first side surface 25a of the support member 25 is disposed facing the first guide plate 16a in the axial direction. The first side surface 25a is slidable with respect to the first guide plate 16a. The second side surface 25b of the support member 25 is disposed facing the second guide plate 16b in the axial direction. The second side surface 25b is slidable with respect to the second guide plate 16b.

As shown in FIGS. 2 and 3, the support member 25 has a penetration portion 25c that extends through the first side surface 25a and the second side surface 25b of the support member 25 in the axial direction. The coupling member 15 is connected to the support member 25 by passing the coupling member 15 through the penetration portion 25c. Here, the penetration portion 25c defines an opening in each of the first side surface 25a and the second side surface 25b of the support member 25.

The first barrier portion 22 is provided on one of the clutch operating member 20 and the reel main body 2. The first barrier portion 22 is configured to prevent the fishing line from entering between the clutch operating member 20 and the first side plate 6a of the reel main body 2. In the present embodiment, the first barrier portion 22 is provided on the clutch operating member 20. More specifically, as shown in FIGS. 2 and 3, the first barrier portion 22 is provided at the upper end of the first side surface 25a of the support member 25. The first barrier portion 22 projects from the first side surface 25a of the support member 25 toward the first side plate 6a of the reel main body 2, as shown in FIG. 4. In addition, as shown in FIG. 4, the first barrier portion 22 is disposed in a position in which at least a portion thereof overlaps the first flange portion 3b of the spool 3 in a front-rear direction the reel main body 2. In other words, at least a portion of the first barrier portion 22 is disposed axially outward of the bobbin trunk 3a of the spool 3. The first barrier portion 22 cam be further provided on the lower end side of the support member 25.

The first barrier portion 22 moves integrally with the clutch operating member 20. The first barrier portion 22 is disposed in a position facing the first guide plate 16a in the front-rear direction and is slidable along the outer edge of the first guide plate 16a. In addition, the outer side surface 22a of the first barrier portion 22 faces the first side plate 6a in the axial direction and is slidable with respect to the first side plate 6a.

The first barrier portion 22 has an inclined portion 22b that is formed on the upper portion of the first barrier portion 22. The inclined portion 22b guides the fishing line from a side of the reel main body 2 with the first side plate 6a toward the operating part 21 of the clutch operating member 20. In the present embodiment, the inclined portion 22b is inclined downwards to the left as seen from the rear of the reel main body 2.

The second barrier portion 23 prevents the fishing line from entering between the clutch operating member 20 and the second side plate 6b of the reel main body 2. The second barrier portion 23 projects from the second side surface 25b of the support member 25 toward the second side plate 6b of the reel main body 2. Since the second barrier portion 23 has a shape that is bilaterally symmetrical with the first barrier portion 22, a detailed description thereof has been omitted here.

In the dual-bearing reel 100 configured as described above, it is possible to prevent the fishing line from entering between the clutch operating member 20 and the first side plate 6a of the reel main body 2 by the first barrier portion 22. More specifically, when the dual-bearing reel 100 is used, particularly when fishing line attempts to enter between the clutch operating member 20 and the reel main body 2 from above the clutch operating member 20 and the reel main body 2, the fishing line contacts the first barrier portion 22, which restricts entry of the fishing line. Additionally, in the present embodiment, because the first barrier portion 22 is disposed in a position that overlaps the first flange portion 3b of the spool 3 in the front-rear direction, it is possible effectively to prevent the fishing line from entering between the clutch operating member 20 and the first side plate 6a of the reel main body 2. Furthermore, by providing the inclined portion 22b of the first barrier portion 22, the fishing line that comes into contact with the first barrier portion 22 is guided from the side of the reel main body 2 with the first side plate 6a towards the operating part 21 of the clutch operating member 20. Accordingly, it is possible more effectively to prevent the fishing line from entering between the clutch operating member 20 and the first side plate 6a of the reel main body 2.

The second barrier portion 23 is able to achieve the same effect as the second barrier portion 23 on the side of the reel main body 2 with the second side plate 6b side. In other words, in the dual-bearing reel 100 configured as described above, it is possible to prevent the fishing line from entering between the clutch operating member 20 and the second side plate 6b of the reel main body 2 by the second barrier portion 23. More specifically, when the dual-bearing reel 100 is used, particularly when fishing line attempts to enter between the clutch operating member 20 and the reel main body 2 from above the clutch operating member 20 and the reel main body 2, the fishing line contacts the second barrier portion 23, which restricts entry of the fishing line. Additionally, in the present embodiment, because the second barrier portion 23 is disposed in a position that overlaps the second flange portion 3c of the spool 3 in the front-rear direction, it is possible effectively to prevent the fishing line from entering between the clutch operating member 20 and the second side plate 6b of the reel main body 2. Furthermore, by providing an inclined portion (not numbered) of the second barrier portion 23, the fishing line that comes into contact with the second barrier portion 23 is guided from the side of the reel main body 2 with the second side plate 6b towards the operating part 21 of the clutch operating member 20. Accordingly, it is possible more effectively to prevent the fishing line from entering between the clutch operating member 20 and the second side plate 6b of the reel main body 2.

In addition, because the axial length L1 of the operating part 21 is shorter than the axial length L2 of the spool 3 in the dual-bearing reel 100 configured as described above, it is possible for the clutch operating member 20 to move smoothly in the vertical direction while preventing the fishing line from entering between the clutch operating member 20 and the first side plate 6a of the reel main body 2.

OTHER EMBODIMENTS

One embodiment of the present invention was described above, but the present invention is not limited to the above-described embodiment, and various modifications can be made without departing from the scope of the invention. In particular, the various embodiments described in the present Specification may be combined in any manner as requirements dictate.

Figure 5:
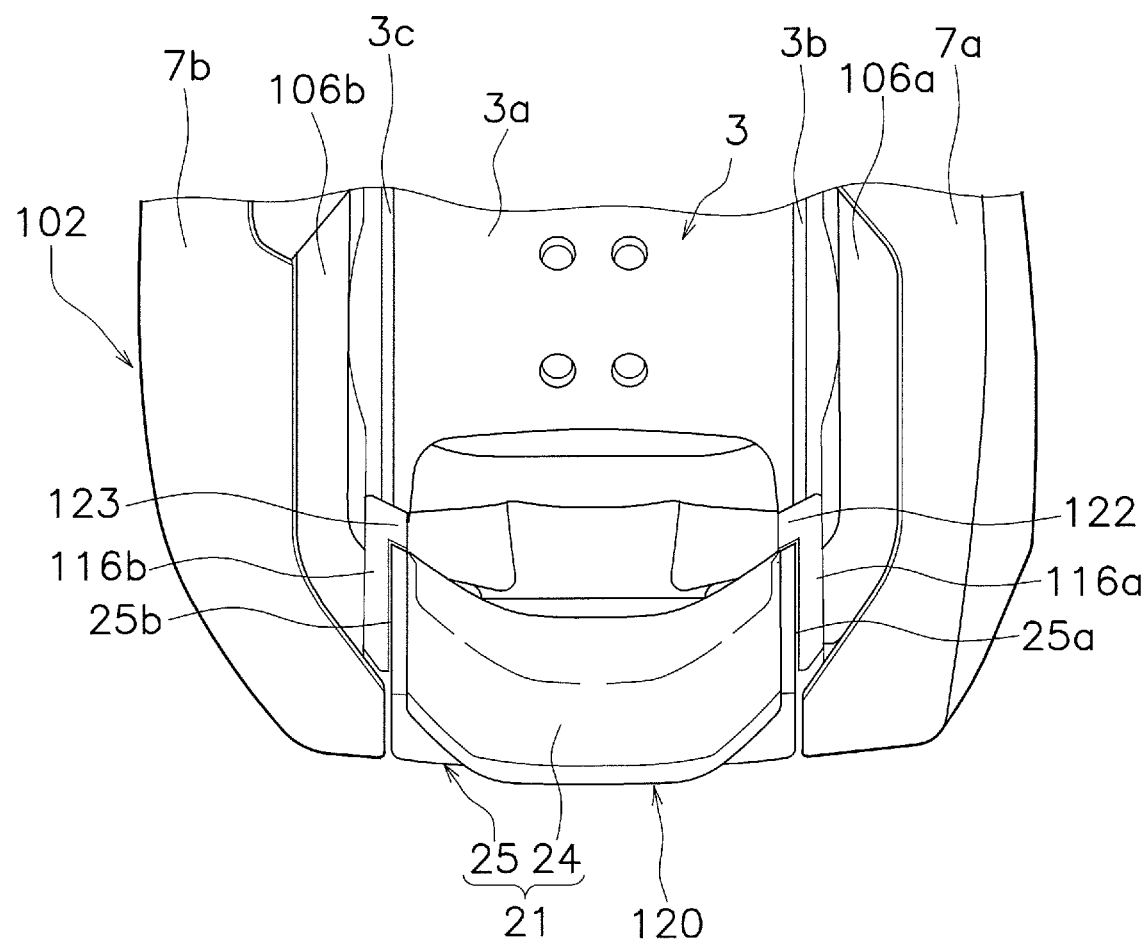
FIG. 5 is a partial top plan view, corresponding to FIG. 4, of a portion of a dual-bearing reel in accordance with another embodiment

While the first barrier portion 22 and the second barrier portion 23 are provided on the clutch operating member 20 in the embodiment described above, the first barrier portion 22 and the second barrier portion 23 can be provided on the reel main body 2. In this case, as shown in FIG. 5, a first barrier portion 122 projects from a side of a reel main body 102 having a first side plate 106a towards a clutch operating member 120. Also, a second barrier portion 123 projects from a side of a reel main body 102 having a second side plate 106b towards the clutch operating member 120. Here, the first barrier portion 122 is provided on a first guide plate 116a, and the second barrier portion 123 is provided on a second guide plate 116b. The first barrier portion 122 and the second barrier portion 123 can be integrally provided with the first side plate 106a and the second side plate 106b. Also, when the first barrier portion 122 and the second barrier portion 123 are provided on the reel main body 102, it is preferable to provide the first barrier portion 122 and the second barrier portion 123 that are in accordance with a length of a range of movement of the clutch operating member 120 between the first position and the second position.

In addition, the first barrier portion 22 can be provided on one of the clutch operating member 20 and the reel main body 2, and the second barrier portion 23 can be provided on the other one of the reel main body 2 and the clutch operating member 20. Specifically, for example, the first barrier portion 22 can be provided on the clutch operating member 20 on a side of the reel main body 2 having the first side plate 6a, and the second barrier portion 23 can be provided on the reel main body 2 on a side of the reel main body 2 having the second side plate 6b.

While the dual-bearing reel 100 comprises the first barrier portion 22 and the second barrier portion 23 in the embodiment described above, it suffices if the dual-bearing reel 100 comprises at least one of the first barrier portion 22 and the second barrier portion 23.

What is claimed is:

1. A dual-bearing reel for unreeling a fishing line, the dual-bearing reel comprising:
   a reel main body having a first side plate and a second side plate that is spaced apart from the first side plate in an axial direction;
   a spool having a bobbin trunk, a first flange portion disposed on a side of the bobbin trunk adjacent to the first side plate, and a second flange portion disposed on a side of the bobbin trunk adjacent to the second side plate, the first and second flange portions having larger outer diameters than an outer periphery of the bobbin trunk, the spool being rotatably supported by the reel main body between the first side plate and the second side plate for winding the fishing line around the outer periphery of bobbin trunk;
   a clutch operating member including an operating part that has an axial length that is shorter than the axial length of the spool, the clutch operating member being movably supported on the reel main body behind the spool to move in a vertical direction with respect to the reel main body between the first side plate and the second side plate, the clutch operating member being configured to switch between transmitting and disconnecting a rotational force inputted to the spool;
   a coupling member connected to the clutch operating member, and configured to connect the clutch operating member to a clutch control mechanism; and
   a barrier portion provided on one of the clutch operating member and the reel main body, the barrier portion being arranged to prevent the fishing line from entering between the clutch operating member and the first side plate of the reel main body.

2. The dual bearing reel according to claim 1, wherein the barrier portion projects from one of the clutch operating member and the first side plate side of the reel main body toward the other of the clutch operating member and the reel main body on the first side plate side.

3. The dual bearing reel according to claim 2, wherein the barrier portion projects from the clutch operating member toward the first side plate of the reel main body, and the barrier portion moves integrally with the clutch operating member.

4. The dual bearing reel according to claim 2, wherein the barrier portion is disposed in a position where at least a part of the barrier portion overlaps with the first flange portion of the spool in a front-rear direction of reel main body.

5. The dual bearing reel according to claim 2, wherein the barrier portion includes an inclined portion that is inclined to guide the fishing line from the first side plate side of the reel main body towards the operating part of the clutch operating member.

6. The dual bearing reel according to claim 3, wherein the barrier portion is disposed in a position where at least a part of the barrier portion overlaps with the first flange portion of the spool in a front-rear direction of reel main body.

7. The dual bearing reel according to claim 6, wherein the barrier portion includes an inclined portion that is inclined to guide the fishing line from the first side plate side of the reel main body towards the operating part of the clutch operating member.

8. The dual bearing reel according to claim 7, further comprising
   an additional barrier portion provided on one of the clutch operating member and the reel main body, the additional barrier portion being arranged to prevent the fishing line from entering between the clutch operating member and the second side plate of the reel main body.

9. The dual bearing reel according to claim 8, further comprising
   a handle rotatably arranged with respect to the reel main body, the handle being operatively coupled to the spool to rotate the spool as the handle is rotated while the clutch operating member is switched to transmit the rotational force to the spool.

10. The dual bearing reel according to claim 1, wherein the barrier portion projects from the clutch operating member toward the first side plate of the reel main body, and the barrier portion moves integrally with the clutch operating member.

11. The dual bearing reel according to claim 10, wherein the barrier portion is disposed in a position where at least a part of the barrier portion overlaps with the first flange portion of the spool in a front-rear direction of reel main body.

12. The dual bearing reel according to claim 10, wherein the barrier portion includes an inclined portion that is inclined to guide the fishing line from the first side plate side of the reel main body towards the operating part of the clutch operating member.

13. The dual bearing reel according to claim 1, wherein the barrier portion is disposed in a position where at least a part of the barrier portion overlaps with the first flange portion of the spool in a front-rear direction of reel main body.

14. The dual bearing reel according to claim 13, wherein the barrier portion includes an inclined portion that is inclined to guide the fishing line from the first side plate side of the reel main body towards the operating part of the clutch operating member.

15. The dual bearing reel according to claim 1, wherein the barrier portion includes an inclined portion that is inclined to guide the fishing line from the first side plate side of the reel main body towards the operating part of the clutch operating member.

16. The dual bearing reel according to claim 1, further comprising
an additional barrier portion provided on one of the clutch operating member and the reel main body, the additional barrier portion being arranged to prevent the fishing line from entering between the clutch operating member and the second side plate of the reel main body.

17. The dual bearing reel according to claim 1, further comprising
a handle rotatably arranged with respect to the reel main body, the handle being operatively coupled to the spool to rotate the spool as the handle is rotated while the clutch operating member is switched to transmit the rotational force to the spool.

18. The dual bearing reel according to claim 1, wherein the barrier portion is disposed on a cover member.

\* \* \* \* \*